(12) United States Patent
Yoshida et al.

(10) Patent No.: US 10,767,727 B2
(45) Date of Patent: Sep. 8, 2020

(54) TOOTHED BELT

(71) Applicant: BANDO CHEMICAL INDUSTRIES, LTD., Kobe-shi, Hyogo (JP)

(72) Inventors: Yasuhiko Yoshida, Kobe (JP); Atsushi Taga, Kobe (JP); Yoshitaka Meki, Kobe (JP); Eijiro Nakashima, Kobe (JP)

(73) Assignee: BANDO CHEMICAL INDUSTRIES, LTD., Kobe-Shi (JP)

( * ) Notice: Subject to any disclaimer, the term of this patent is extended or adjusted under 35 U.S.C. 154(b) by 0 days.

(21) Appl. No.: 16/118,287

(22) Filed: Aug. 30, 2018

(65) Prior Publication Data

US 2019/0011016 A1  Jan. 10, 2019

Related U.S. Application Data

(63) Continuation of application No. PCT/JP2017/000136, filed on Jan. 5, 2017.

(30) Foreign Application Priority Data

Mar. 29, 2016 (JP) .................................. 2016-064796

(51) Int. Cl.
*F16G 1/28* (2006.01)
*C08K 5/098* (2006.01)
(Continued)

(52) U.S. Cl.
CPC .................. *F16G 1/28* (2013.01); *B32B 3/28* (2013.01); *B32B 3/30* (2013.01); *B32B 25/10* (2013.01);
(Continued)

(58) Field of Classification Search
CPC .. B32B 3/28; B32B 3/30; B32B 25/10; B32B 2433/04; C08K 5/098; F16G 1/10; F16G 1/28; C08L 23/08; C08J 5/005; C08J 5/24; C08J 2323/16; C08J 2323/28; C08J 2323/02
See application file for complete search history.

(56) References Cited

U.S. PATENT DOCUMENTS

| 2005/0113200 A1 | 5/2005 | Okuno et al. |
| 2006/0148603 A1 | 7/2006 | Burrowes et al. |
| | (Continued) | |

FOREIGN PATENT DOCUMENTS

| JP | 11-158744 A | 6/1999 |
| JP | 2004-245405 A | 9/2004 |
| | (Continued) | |

*Primary Examiner* — Shane Fang
(74) *Attorney, Agent, or Firm* — Maschoff Brennan

(57) ABSTRACT

A toothed belt is provided with toothed portions arranged at a regular pitch in a belt length direction. A belt body is made of a rubber composition containing, as a main ingredient of a rubber component, ethylene-α-olefin elastomer having an ethylene content of 44% by mass to 66% by mass. A reinforcing fabric is adhered to a surface of the belt body on a toothed side, with a reinforcing fabric adhesion coat interposed between the reinforcing fabric and the belt body. The reinforcing fabric adhesion coat is made of a rubber composition containing hydrogenated nitrile-butadiene rubber as a main ingredient of a rubber component.

16 Claims, 6 Drawing Sheets

(51) Int. Cl.
    *C08L 23/08*         (2006.01)
    *B32B 3/28*           (2006.01)
    *B32B 3/30*           (2006.01)
    *B32B 25/10*          (2006.01)
    *C08J 5/00*           (2006.01)
    *C08J 5/24*           (2006.01)
    *F16G 1/10*           (2006.01)

(52) U.S. Cl.
    CPC ................. *C08J 5/005* (2013.01); *C08J 5/24* (2013.01); *C08K 5/098* (2013.01); *C08L 23/08* (2013.01); *F16G 1/10* (2013.01); *B32B 2433/04* (2013.01); *C08J 2309/02* (2013.01); *C08J 2323/16* (2013.01); *C08J 2323/28* (2013.01)

(56) References Cited

U.S. PATENT DOCUMENTS

2011/0237374 A1*   9/2011   Nakao .................... C08K 5/098
                                                                              474/205
2015/0219185 A1     8/2015   Matsuda

FOREIGN PATENT DOCUMENTS

| JP | 2007-9966 A | 1/2007 |
| --- | --- | --- |
| JP | 2011-196526 A | 10/2011 |
| WO | 2014/064879 A1 | 5/2014 |

\* cited by examiner

TOOTHED BELT

CROSS-REFERENCE TO RELATED APPLICATIONS

This is a continuation of International Application No. PCT/JP2017/000136 filed on Jan. 5, 2017, which claims priority to Japanese Patent Application No. 2016-064796 filed on Mar. 29, 2016. The entire disclosures of these applications are incorporated by reference herein.

BACKGROUND

The present invention relates to a toothed belt.

A toothed belt made of rubber has a belt body made of a rubber composition, a cord buried in the belt body, and a reinforcing fabric adhered to a surface of the belt body on a toothed side. A cord adhesion coat is interposed between the belt body and the cord. A reinforcing fabric adhesion coat is interposed between the belt body and the reinforcing fabric.

Japanese Unexamined Patent Publication No. 2004-245405 discloses that a belt body of a toothed belt is made of a rubber composition containing ethylene propylene diene terpolymer as a rubber component, that a cord is buried in the belt body with a cord adhesion coat (which is made of a rubber composition containing chlorosulfonated polyethylene as a rubber component) interposed therebetween, and that a reinforcing fabric is adhered to a surface of the belt body on a toothed side, with a reinforcing fabric adhesion coat (which is made of a rubber composition containing hydrogenated nitrile-butadiene rubber as a rubber component) interposed therebetween.

SUMMARY

The present invention is directed to a toothed belt provided with toothed portions arranged at a regular pitch in a belt length direction. The toothed belt includes: a belt body made of a rubber composition containing, as a main ingredient of a rubber component, ethylene-α-olefin elastomer having an ethylene content of 44% by mass to 66% by mass; and a reinforcing fabric adhered to a surface of the belt body on a toothed side, with a reinforcing fabric adhesion coat interposed between the belt body and the reinforcing fabric, the reinforcing fabric adhesion coat being made of a rubber composition containing hydrogenated nitrile-butadiene rubber as a main ingredient of a rubber component.

DETAILED DESCRIPTION

An embodiment will be described in detail below.

Toothed Belt B

Figure 1:
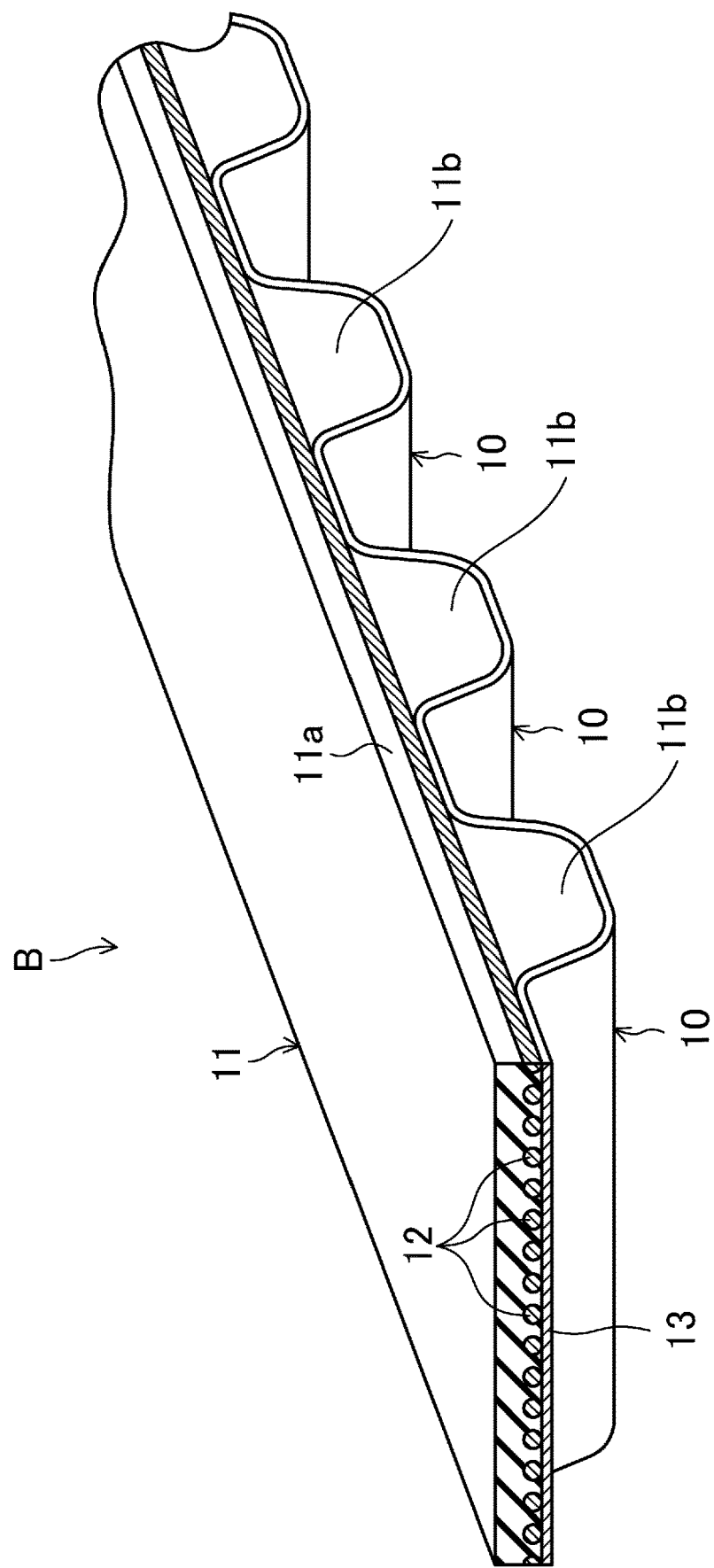
FIG. 1 illustrates a perspective view of a toothed belt according to an embodiment.

FIG. 1 illustrates a toothed belt B according to an embodiment.

The toothed belt B according to the embodiment is an endless engaging transmission belt provided with a plurality of toothed portions 10 arranged at a regular pitch in the belt length direction and constituting an inner side portion of the belt. Each toothed portion 10 is a trapezoidal tooth having a trapezoidal shape when viewed from the side and extending in the belt width direction. The toothed portion 10 may have another shape, such as a round teeth having a semicircular shape when viewed from the side, or a helical teeth extending in a direction angled with the belt width direction.

The toothed belt B according to the embodiment is suitable as a transmission member for an automobile and various other machines. The toothed belt B of the embodiment has a length of 500 mm to 3000 mm, a width of 10 mm to 200 mm, and a thickness of 3 mm to 20 mm, for example. The toothed portion 10 has a width of 0.63 mm to 16.46 mm, a height of 0.37 mm to 9.6 mm, and a pitch of 1.0 mm to 31.75 mm.

The toothed belt B according to the embodiment includes a belt body 11, a cord 12, and a reinforcing fabric 13. The belt body 11 includes a backface rubber portion 11a having a strip shape and constituting an outer side portion of the belt, and a plurality of toothed rubber portions 11b constituting an inner side portion of the belt. The cord 12 is embedded in an inner side portion of the backface rubber portion 11a of the belt body 11 so as to form a helical pattern having a pitch in a belt width direction. The reinforcing fabric 13 is adhered to a surface of the belt body 11 on the toothed side so as to cover the surface. Thus, each toothed portion 10 is comprised of the toothed rubber portion 11b of the belt body 11 and the reinforcing fabric 13 covering the toothed portion 11b. Further, the cord 12 is positioned right under the reinforcing fabric 13 at a tooth bottom portion between adjacent toothed portions 10.

The belt body 11 is made of a rubber composition produced by heating and pressing an uncrosslinked rubber composition prepared by mixing a rubber component and various compound ingredients, and thereby crosslinking the rubber component by a crosslinking agent.

The rubber component of the rubber composition making the belt body 11 contains ethylene-α-olefin elastomer as a main ingredient. Examples of the ethylene-α-olefin elastomer contained in the rubber component include ethylene propylene copolymer (EPR), ethylene propylene diene terpolymer (hereinafter referred to as "EPDM"), ethylene-octene copolymer, and ethylene-butene copolymer. Suitably, the rubber component contains one kind or two or more kinds of ethylene-α-olefin elastomer. The rubber component suitably contains an EPDM. The content of the ethylene-α-olefin elastomer in the rubber component is more than 50% by mass. In order to achieve superior heat resistance and cold resistance, the content of the ethylene-α-olefin elastomer in the rubber component is suitably 90% by mass or more, more suitably 95% by mass or more, and most suitably 100% by mass. The rubber component may contain, in addition to the ethylene-α-olefin elastomer, a hydrogenated acrylonitrile rubber (hereinafter referred to as "H-NBR"), a chlorosulfonated polyethylene rubber (hereinafter referred to as "CSM"), and a chloroprene rubber (hereinafter referred to as "CR"), for example.

The ethylene content of the ethylene-α-olefin elastomer contained in the rubber component is 44% by mass to 66% by mass. In order to achieve superior heat resistance and cold resistance, the ethylene content of the ethylene-α-olefin elastomer contained in the rubber component is suitably 50% by mass or more, more suitably 55% by mass or more, and still more suitably 58% by mass or more, and suitably 61% by mass or less, more suitably 60% by mass or less, and still more suitably 59% by mass or less.

If the rubber component contains an EPDM, examples of a diene component of the EPDM include ethylidene norbornene (ENB), dicyclopentadiene, and 1,4-hexadiene. Among these substances, ethylidene norbornene is suitable as the diene component. If the diene component is the ethylidene norbornene, the ENB content in EPDM is suitably 4.0% by mass or more, more suitably 4.6% by mass or more, and still more suitably 5.0% by mass or more, and suitably 6.0% by mass or less, more suitably 5.7% by mass or less, and still more suitably 5.2% by mass or less in order to achieve superior heat resistance and cold resistance.

The Mooney viscosity at 125° C. of the ethylene-α-olefin elastomer contained in the rubber component is suitably 15 $ML_{1+4}$ (125° C.) or more, more suitably 59 $ML_{1+4}$ (125° C.) or more, and still more suitably 62 $ML_{1+4}$ (125° C.) or more, and suitably 90 $ML_{1+4}$ (125° C.) or less, more suitably 70 $ML_{1+4}$ (125° C.) or less, and still more suitably 64 $ML_{1+4}$ (125° C.) or less in order to achieve superior heat resistance and cold resistance. The Mooney viscosity is measured based on JIS K6300 (the same hereinafter).

Examples of the compound ingredients include a reinforcing material, a softener, a vulcanization accelerator aid, a co-crosslinking agent, a crosslinking agent, and a vulcanization accelerator. In order to achieve superior heat resistance and cold resistance, the rubber composition making the belt body 11 suitably contains a co-crosslinking agent.

Examples of carbon blacks used as the reinforcing material include: channel black; furnace black such as SAF, ISAF, N-339, HAF, N-351, MAF, FEF, SRF, GPF, ECF, and N-234; thermal black such as FT and MT; and acetylene black. Silica may also be used as the reinforcing material. Suitably, the reinforcing material contains one kind or two or more kinds of these substances. The reinforcing material suitably contains FEF carbon black. The content of the reinforcing material with respect to 100 parts by mass of the rubber component of the rubber composition is 50 parts by mass to 80 parts by mass, for example.

Examples of the softener include paraffin-based, petroleum-based, mineral oil-based, and vegetable oil-based softeners. Suitably, the softener contains one kind or two or more kinds of these softeners. The softener suitably contains a paraffin-based softener. The content of the softener with respect to 100 parts by mass of the rubber component is 2 parts by mass to 30 parts by mass, for example.

Examples of the vulcanization accelerator aid include a metal oxide, such as a zinc oxide (zinc white) and a magnesium oxide, a metal carbonate, a fatty acid and a derivative thereof, for example. Suitably, the vulcanization accelerator aid contains one kind or two or more kinds of these substances. The vulcanization accelerator aid suitably contains a zinc oxide. The content of the vulcanization accelerator aid with respect to 100 parts by mass of the rubber component of the rubber composition is 3 parts by mass to 7 parts by mass, for example.

Examples of the co-crosslinking agent include trimethylolpropane trimethacrylate, zinc dimethacrylate, triallyl isocyanurate, and m-phenylenedimaleimide. Suitably, the co-crosslinking agent contains one kind or two or more kinds of these substances. The co-crosslinking agent suitably contains trimethylolpropane trimethacrylate, or zinc dimethacrylate, or trimethylolpropane trimethacrylate and zinc dimethacrylate. The content of the co-crosslinking agent with respect to 100 parts by mass of the rubber component is 1 part by mass to 20 parts by mass, for example. If the co-crosslinking agent contains trimethylolpropane trimethacrylate, the trimethylolpropane trimethacrylate content with respect to 100 parts by mass of the rubber component is suitably 1 part by mass to 3 parts by mass. If the co-crosslinking agent contains zinc dimethacrylate, the zinc dimethacrylate content with respect to 100 parts by mass of the rubber component is suitably 13 parts by mass to 17 parts by mass.

Examples of the crosslinking agent include an organic peroxide and sulfur. An organic peroxide or sulfur may be used as the crosslinking agent, or both of them may be used as the crosslinking agent. The crosslinking agent suitably contains an organic peroxide. If an organic peroxide is used as the crosslinking agent, the content of the crosslinking agent with respect to 100 parts by mass of the rubber component is 1 part by mass to 5 parts by mass, for example. If sulfur is used as the crosslinking agent, the content of the crosslinking agent with respect to 100 parts by mass of the rubber component is 0.5 parts by mass to 3 parts by mass, for example.

Examples of the vulcanization accelerator include sulfenamide-based, thiuram-based, thiazole-based, dithiocarbamate-based vulcanization accelerators. Suitably, the vulcanization accelerator contains one kind or two or more kinds of these vulcanization accelerators. The vulcanization accelerator suitably contains sulfenamide-based and thiuram-based vulcanization accelerators. The content of the vulcanization accelerator with respect to 100 parts by mass of the rubber component is 1 part by mass to 5 parts by mass, for example.

The cord 12 is made of a twisted yarn of fibers, such as glass fibers, aramid fibers, carbon fibers, and metal fibers. The cord 12 may be made of S-twist yarn, Z-twist yarn, or S-twist yarn and Z-twist yarn arranged in a double helix form. The diameter of the cord 12 is, for example, 0.5 mm to 2.5 mm. The distance between the centers of the cord 12 which are adjacent to each other in a cross-section of the belt is 0.05 mm to 0.20 mm, for example.

Figure 2A:
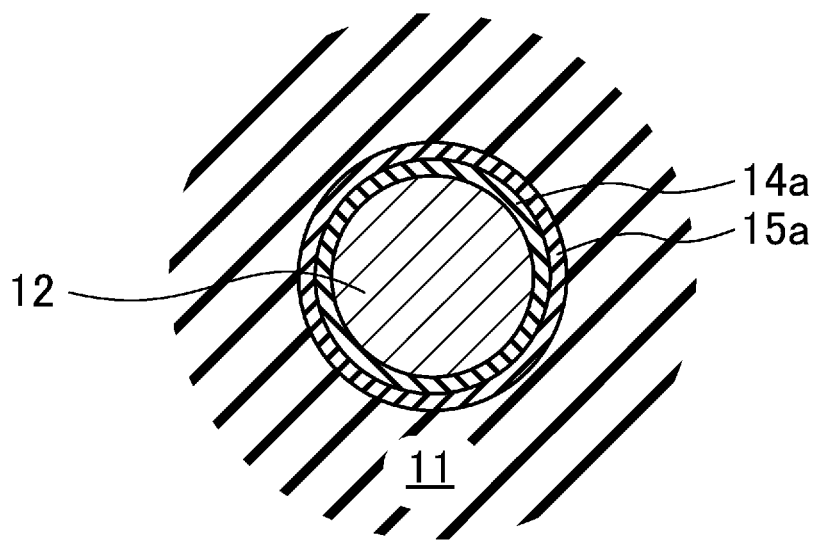
FIG. 2A illustrates a cross-sectional view of a cord to show how the cord is buried.

As illustrated in FIG. 2A, the cord 12 is coated with an RFL adhesion coat 14a, and further with a cord adhesion coat 15a to coat the outside of the cord 12 coated with the RFL adhesion coat 14a. The cord 12 is buried in the belt body 11 with the RFL adhesion coat 14a and the cord adhesion coat 15a interposed between the belt body 11 and the cord 12.

The RFL adhesion coat 14a is made of a mixture containing: a condensate (RF) of resorcin and formaldehyde; and a rubber component (L) derived from latex.

The R/F (a molar ratio) of the RFL adhesion coat 14a is 1/1 to 1/2, for example. The RF/L (a mass ratio) of the RFL adhesion coat 14a is 1/5 to 1/20, for example. Examples of the rubber component (L) include CSM, 2,3-dichloro-1,3-butadiene polymer (hereinafter referred to as "2,3-DCB"), vinylpyridine styrene butadiene copolymer (hereinafter referred to as "Vp-SBR"), and CR. Suitably, the rubber component (L) contains one kind or two or more kinds of these substances. In order to achieve superior adhesiveness with the belt body 11, the rubber component (L) suitably contains CSM or 2,3-DCB.

The cord adhesion coat 15a is made of a rubber composition produced by heating and pressing an uncrosslinked rubber composition prepared by mixing a rubber component and various rubber compound ingredients, and thereby crosslinking the rubber component by a crosslinking agent.

Suitably, the rubber component of the rubber composition making the cord adhesion coat 15a contains CSM as a main ingredient. In this case, the CSM content in the rubber component is more than 50% by mass. In order to achieve superior adhesiveness with the belt body 11, the CSM content in the rubber component is suitably 90% by mass or more, more suitably 95% by mass or more, and most suitably 100% by mass. The rubber component may contain ethylene-α-olefin elastomer, H-NBR, CR, or the like in addition to the CSM. The rubber component does not have to be the CSM, but may be CR or the like.

If the rubber component contains the CSM, the chlorine content of the CSM contained in the rubber component is suitably 20% by mass or more, more suitably 24% by mass or more, and still more suitably 25% by mass or more, and suitably 45% by mass or less, more suitably 29% by mass or less, and still more suitably 27% by mass or less in order achieve superior adhesiveness with the belt body 11.

The sulfur content of the CSM contained in the rubber component is suitably 0.3% by mass or more, more suitably 0.5% by mass or more, and still more suitably 0.6% by mass or more, and suitably 1.5% by mass or less, more suitably 1.0% by mass or less, and still more suitably 0.8% by mass or less in order achieve superior adhesiveness with the belt body 11.

The Mooney viscosity at 100° C. of the CSM contained in the rubber component is suitably 30 $ML_{1+4}$ (100° C.) or more, more suitably 35 $ML_{1+4}$ (100° C.) or more, and still more suitably 38 $ML_{1+4}$ (100° C.) or more, and suitably 100 $ML_{1+4}$ (100° C.) or less, more suitably 50 $ML_{1+4}$ (100° C.) or less, and still more suitably 45 $ML_{1+4}$ (100° C.) or less in order to achieve superior adhesiveness with the belt body 11.

Examples of the compound ingredients include a reinforcing material, a plasticizer, a processing aid, a vulcanization accelerator aid, a co-crosslinking agent, a crosslinking agent, and an antioxidant.

Examples of carbon blacks used as the reinforcing material include: channel black; furnace black such as SAF, ISAF, N-339, HAF, N-351, MAF, FEF, SRF, GPF, ECF, and N-234; thermal black such as FT and MT; and acetylene black. Silica may also be used as the reinforcing material. Suitably, the reinforcing material contains one kind or two or more kinds of these substances. The reinforcing material suitably contains FEF carbon black and silica. The content of the reinforcing material with respect to 100 parts by mass of the rubber component of the rubber composition is, for example, 40 parts by mass to 60 parts by mass.

Examples of the plasticizer include polyether ester, dialkyl sebacate such as dioctyl sebacate (DOS), dialkyl phthalate such as dibutyl phthalate (DBP) and dioctyl phthalate (DOP), and dialkyl adipate such as dioctyl adipate (DOA). Suitably, the plasticizer contains one kind or two or more kinds of these substances. The plasticizer suitably contains polyether ester and dioctyl sebacate (DOS). The content of the plasticizer with respect to 100 parts by mass of the rubber component is 5 parts by mass to 20 parts by mass, for example.

Examples of the processing aid include a stearic acid, polyethylene wax, and a metal salt of fatty acid. Suitably, the processing aid contains one kind or two or more kinds of these substances. The processing aid suitably contains a stearic acid. The content of the processing aid with respect to 100 parts by mass of the rubber component of the rubber composition is 0.5 parts by mass to 2 parts by mass, for example.

Examples of the vulcanization accelerator aid include a metal oxide, such as a zinc oxide (zinc white) and a magnesium oxide, a metal carbonate, a fatty acid and a derivative thereof, for example. Suitably, the vulcanization accelerator aid contains one kind or two or more kinds of these substances. The vulcanization accelerator aid suitably contains a zinc oxide. The content of the vulcanization accelerator aid with respect to 100 parts by mass of the rubber component of the rubber composition is 3 parts by mass to 7 parts by mass, for example.

Examples of the co-crosslinking agent include trimethylolpropane trimethacrylate, triallyl isocyanurate, zinc dimethacrylate, and m-phenylenedimaleimide. Suitably, the co-crosslinking agent contains one kind or two or more kinds of these substances. The co-crosslinking agent suitably contains trimethylolpropane trimethacrylate. The content of the co-crosslinking agent with respect to 100 parts by mass of the rubber component is 1 part by mass to 3 parts by mass, for example.

Examples of the crosslinking agent include an organic peroxide and sulfur. An organic peroxide or sulfur may be used as the crosslinking agent, or both of them may be used as the crosslinking agent. The crosslinking agent suitably contains an organic peroxide. If an organic peroxide is used as the crosslinking agent, the content of the crosslinking agent with respect to 100 parts by mass of the rubber component is 1 part by mass to 5 parts by mass, for example. If sulfur is used as the crosslinking agent, the content of the crosslinking agent with respect to 100 parts by mass of the rubber component is 0.5 parts by mass to 3 parts by mass, for example.

Examples of the antioxidant include benzimidazole-base, amine-ketone-based, diamine-based, and phenolic antioxidants. Suitably, the antioxidant contains one kind or two or more kinds of these antioxidants. The antioxidant suitably contains a benzimidazole-based antioxidant. The content of the antioxidant with respect to 100 parts by mass of the rubber component is 0.5 parts by mass to 1.5 parts by mass, for example.

Figure 2B:
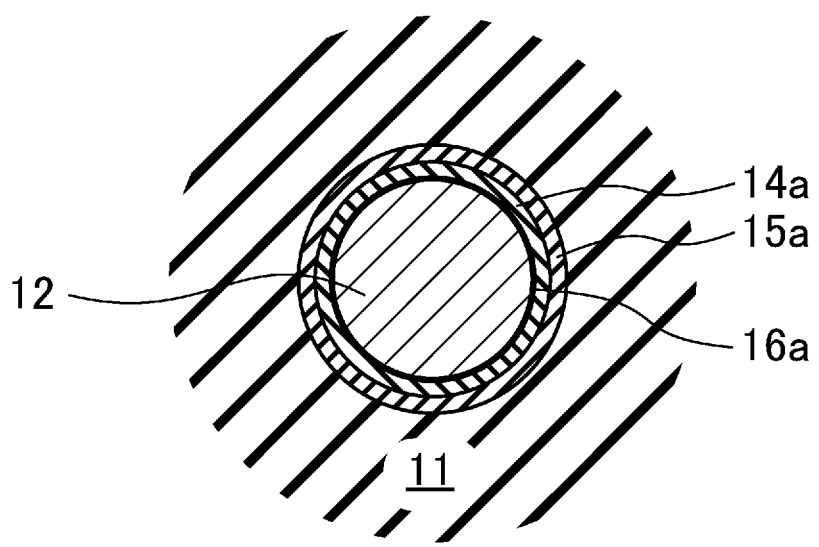
FIG. 2B illustrates a cross-sectional view of a cord to show how the cord is buried as a variation.

As illustrated in FIG. 2B, a primary adhesion coat 16a may be interposed between the cord 12 and the RFL adhesion coat 14a. Thus, the cord 12 may be buried in the belt body 11, with the primary adhesion coat 16a and the RFL adhesion coat 14a which coat the entire cord 12, and the cord adhesion coat 15a which coats the outside of the RFL adhesion coat 14a being interposed between the cord 12 and the belt body 11. Examples of materials for making the primary adhesion coat 16a include epoxy resin and isocyanate resin.

The reinforcing fabric 13 is made of fabric, such as woven fabric, knitted fabric, and unwoven fabric, made of yarn of nylon fibers (polyamide fibers), polyester fibers, aramid fibers, and cotton, for example. Among these fibers, nylon fibers are suitable for the reinforcing fabric 13. In a preferred embodiment, the reinforcing fabric 13 is stretchable. The reinforcing fabric 13 has a thickness ranging from 0.3 mm to 2.0 mm, for example.

Figure 3A:
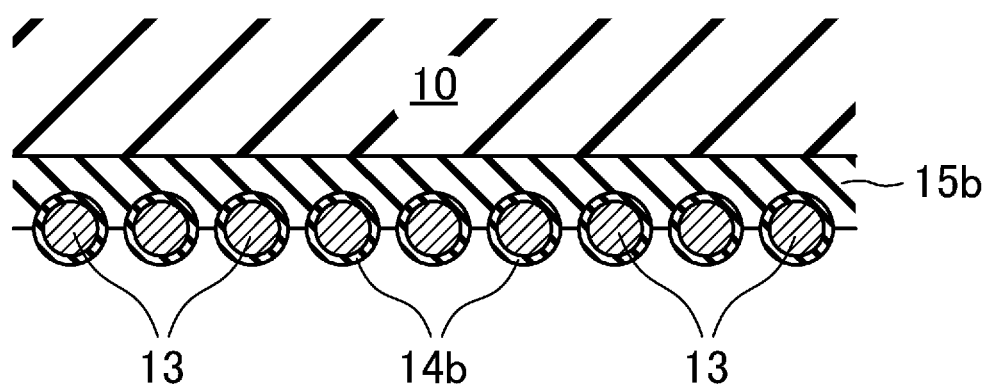
FIG. 3A illustrates a cross-sectional view of a reinforcing fabric to show how the reinforcing fabric is adhered.

As illustrated in FIG. 3A, the reinforcing fabric 13 is coated with an RFL adhesion coat 14b. A reinforcing fabric adhesion coat 15b is also provided on the reinforcing fabric 13 coated with the RFL adhesion coat 14b, and coats a surface of the reinforcing fabric 13 facing the belt body 11. The reinforcing fabric 13 is adhered to the belt body 11 with the RFL adhesion coat 14b and the reinforcing fabric adhesion coat 15b interposed between the reinforcing fabric 13 and the belt body 11.

The RFL adhesion coat 14b is made of a mixture containing: a condensate (RF) of resorcin and formaldehyde; and a rubber component (L) derived from latex.

The R/F (a molar ratio) of the RFL adhesion coat 14b is 1/1 to 1/2, for example. The RF/L (a mass ratio) of the RFL adhesion coat 14a is 1/5 to 1/20, for example. Examples of the rubber component (L) include CSM, 2,3-DCB, Vp-SBR, and CR. Suitably, the rubber component (L) contains one kind or two or more kinds of these substances. In order to achieve superior adhesiveness with the belt body 11, the rubber component (L) suitably contains CSM or 2,3-DCB. The RFL adhesion coat 14b coating the reinforcing fabric 13 may be made of the same material as the RFL adhesion coat 14a coating the cord 12.

The reinforcing fabric adhesion coat 14b is made of a rubber composition produced by heating and pressing an uncrosslinked rubber composition prepared by mixing a rubber component and various rubber compound ingredients, and thereby crosslinking the rubber component by a crosslinking agent.

The rubber component of the rubber composition making the reinforcing fabric adhesion coat 14b contains H-NBR as a main ingredient. The H-NBR content in the rubber component is more than 50% by mass. In order to achieve superior adhesiveness with the belt body 11, the H-NBR content in the rubber component is suitably 90% by mass or more, more suitably 95% by mass or more, and most suitably 100% by mass. The rubber component may contain ethylene-α-olefin elastomer, CSM, CR, or the like in addition to the H-NBR.

The combined acrylonitrile content of the H-NBR contained in the rubber component is suitably 30% by mass or more, more suitably 33% by mass or more, and still more suitably 35% by mass or more, and suitably 50% by mass or less, more suitably 45% by mass or less, and still more suitably 40% by mass or less in order achieve superior adhesiveness with the belt body 11.

The iodine value of the H-NBR contained in the rubber component is suitably 2 mg/100 mg or more, more suitably 4 mg/100 mg or more, and still more suitably 6 mg/100 mg or more, and suitably 30 mg/100 mg or less, more suitably 10 mg/100 mg or less, and still more suitably 8 mg/100 mg or less in order to achieve superior adhesiveness with the belt body 11.

The Mooney viscosity at 100° C. of the H-NBR contained in the rubber component is suitably 50 $ML_{1+4}$ (100° C.) or more, more suitably 60 $ML_{1+4}$ (100° C.) or more, and still more suitably 70 $ML_{1+4}$ (100° C.) or more, and suitably 100 $ML_{1+4}$ (100° C.) or less, more suitably 90 $ML_{1+4}$ (100° C.) or less, and still more suitably 85 $ML_{1+4}$ (100° C.) or less in order to achieve superior adhesiveness with the belt body 11.

The rubber component may contain H-NBR strengthened by an unsaturated carboxylic metal salt. Examples of the unsaturated carboxylic acid include methacrylic acid and acrylic acid. Examples of the metal include zinc, calcium, magnesium, and aluminum.

Examples of the compound ingredients include a reinforcing material, a plasticizer, a processing aid, a vulcanization accelerator aid, a co-crosslinking agent, a crosslinking agent, and an antioxidant.

Examples of carbon blacks used as the reinforcing material include: channel black; furnace black such as SAF, ISAF, N-339, HAF, N-351, MAF, FEF, SRF, GPF, ECF, and N-234; thermal black such as FT and MT; and acetylene black. Silica may also be used as the reinforcing material. Suitably, the reinforcing material contains one kind or two or more kinds of these substances. The reinforcing material suitably contains GPF carbon black and silica. The content of the reinforcing material with respect to 100 parts by mass of the rubber component of the rubber composition is, for example, 40 parts by mass to 60 parts by mass.

Examples of the plasticizer include polyether ester, dialkyl sebacate such as dioctyl sebacate (DOS), dialkyl phthalate such as dibutyl phthalate (DBP) and dioctyl phthalate (DOP), and dialkyl adipate such as dioctyl adipate (DOA). Suitably, the plasticizer contains one kind or two or more kinds of these substances. The plasticizer suitably contains polyether ester. The content of the plasticizer with respect to 100 parts by mass of the rubber component is 5 parts by mass to 15 parts by mass, for example.

Examples of the processing aid include a stearic acid, polyethylene wax, and a metal salt of fatty acid. Suitably, the processing aid contains one kind or two or more kinds of these substances. The processing aid suitably contains a stearic acid. The content of the processing aid with respect to 100 parts by mass of the rubber component of the rubber composition is 0.5 parts by mass to 2 parts by mass, for example.

Examples of the vulcanization accelerator aid include a metal oxide, such as a zinc oxide (zinc white) and a magnesium oxide, a metal carbonate, a fatty acid and a derivative thereof, for example. Suitably, the vulcanization accelerator aid contains one kind or two or more kinds of these substances. The vulcanization accelerator aid suitably contains a zinc oxide. The content of the vulcanization accelerator aid with respect to 100 parts by mass of the rubber component of the rubber composition is 3 parts by mass to 7 parts by mass, for example.

Examples of the co-crosslinking agent include trimethylolpropane trimethacrylate, zinc dimethacrylate, triallyl isocyanurate, and m-phenylenedimaleimide. Suitably, the co-crosslinking agent contains one kind or two or more kinds of these substances. The co-crosslinking agent suitably contains trimethylolpropane trimethacrylate. The content of the co-crosslinking agent with respect to 100 parts by mass of the rubber component is 1 part by mass to 3 parts by mass, for example.

Examples of the crosslinking agent include an organic peroxide and sulfur. An organic peroxide or sulfur may be used as the crosslinking agent, or both of them may be used as the crosslinking agent. Suitably, the crosslinking agent contains both of an organic peroxide and sulfur. If an organic peroxide is used as the crosslinking agent, the content of the crosslinking agent with respect to 100 parts by mass of the rubber component is 1 part by mass to 5 parts by mass, for example. If sulfur is used as the crosslinking agent, the content of the crosslinking agent with respect to 100 parts by mass of the rubber component is 0.5 parts by mass to 3 parts by mass, for example.

Examples of the antioxidant include benzimidazole-base, amine-ketone-based, diamine-based, and phenolic antioxidants. Suitably, the antioxidant contains one kind or two or more kinds of these antioxidants. The antioxidant suitably contains a benzimidazole-based antioxidant. The content of the antioxidant with respect to 100 parts by mass of the rubber component is 0.5 parts by mass to 1.5 parts by mass, for example.

Figure 3B:
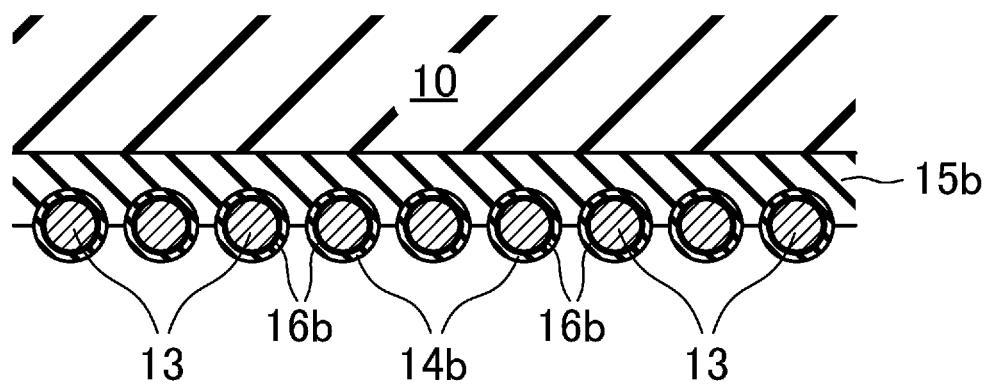
FIG. 3B illustrates a cross-sectional view of a reinforcing fabric to show how the reinforcing fabric is adhered as a variation.

As illustrated in FIG. 3B, a primary adhesion coat 16*b* may be interposed between the reinforcing fabric 13 and the RFL adhesion coat 14*b*. Thus, the reinforcing fabric 13 may be adhered to the belt body 11, with the primary adhesion coat 16*b* and the RFL adhesion coat 14*b* which coat the entire reinforcing fabric 13, and the reinforcing fabric adhesion coat 15*b* which coats the surface of the reinforcing fabric 13 facing the belt body 11 interposed between the reinforcing fabric 13 and the belt body 11. Examples of materials for making the primary adhesion coat 16*b* include epoxy resin and isocyanate resin.

Figure 3C:
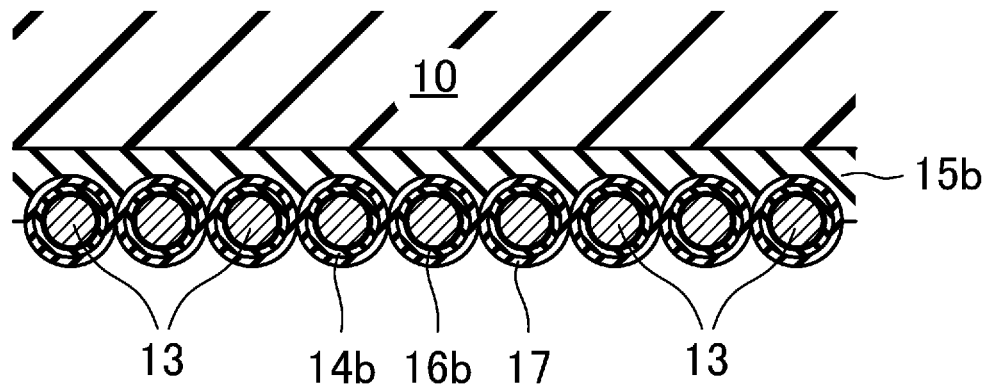
FIG. 3C illustrates a cross-sectional view of a reinforcing fabric to show how the reinforcing fabric is adhered as another variation.

As illustrated in FIG. 3C, an impregnated rubber adhesion coat 17 may be provided so as to coat the outside of the RFL adhesion coat 14*b*. Thus, the reinforcing fabric 13 may be adhered to the belt body 11, with the reinforcing fabric adhesion coat 14*b* and the impregnated rubber adhesion coat 17 which coat the entire reinforcing fabric 13, and the reinforcing fabric adhesion coat 15*b* which coats the surface of the reinforcing fabric 13 facing the belt body 11 interposed between the reinforcing fabric 13 and the belt body 11. Suitably, the impregnated rubber adhesion coat 17 is made of a rubber composition containing H-NBR as a main ingredient of the rubber component, similarly to the reinforcing fabric adhesion coat 15*b*. The impregnated rubber adhesion coat 17 may be made of the same rubber composition as the reinforcing fabric adhesion coat 15*b*. Also in this case, the primary adhesion coat 16*b* may be provided between the reinforcing fabric 13 and the RFL adhesion coat 14*b*.

According to the toothed belt B of the present embodiment configured as described above, superior heat resistance and cold resistance can be achieved by the belt body 11 made of a rubber composition containing ethylene-α-olefin elastomer, the ethylene content of which is 44% by mass to 66% by mass, as a main ingredient of the rubber component, and by the reinforcing fabric adhesion coat 15*b* made of a rubber composition containing H-NBR as a main ingredient of the rubber component.

Method for Forming V-Ribbed Belt B

A method for forming the toothed belt B according to the embodiment will be described with reference to FIGS. 4 to 7.

Figure 4:
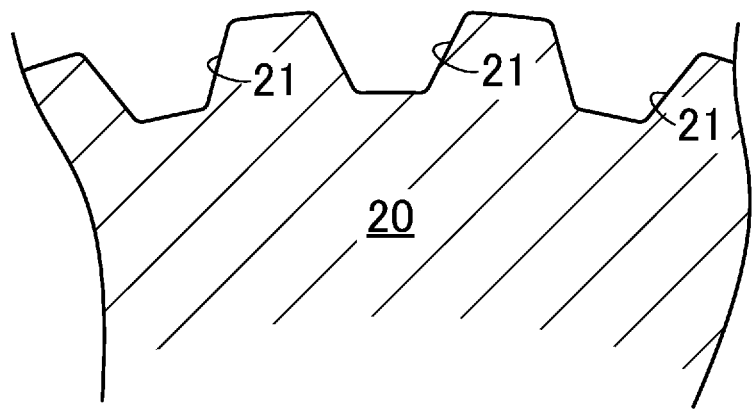
FIG. 4 illustrates a cross-sectional view of a belt forming mold.

FIG. 4 illustrates a belt forming mold 20 used to form the toothed belt B according to the embodiment.

The belt forming mold 20 is cylindrical and provided, on its outer circumferential surface, with toothed portion-forming grooves 21 extending in an axial direction of the mold 20 and arranged at a regular pitch in a circumferential direction of the mold 20.

A method for forming the toothed belt according to the embodiment includes a material preparation step, a shaping step, a cross-linking step, and a finishing step.

Material Preparation Step

Uncrosslinked Rubber Sheet 11' for Backface Rubber Portion and Toothed Rubber Portion A rubber component containing ethylene-α-olefin elastomer as a main ingredient is masticated. Various compound ingredients are put into this rubber component and kneaded together, thereby obtaining an uncrosslinked rubber composition.

The resultant uncrosslinked rubber composition is shaped into a sheet by calendering, for example, to form an uncrosslinked rubber sheet 11' for making the backface rubber portion and the toothed rubber portion.

Cord 12'

An RFL aqueous solution for use in an RFL adhesion treatment is prepared by mixing: an initial condensate (RF) of resorcin (R) and formaldehyde (F); and latex (L).

The cord 12' is immersed in this RFL aqueous solution and then heated in a heating furnace. At this moment, the cord 12' is impregnated with the RFL aqueous solution. The RFL adhesion coat 14*a* adheres to the cord 12' such that the entire cord 12', including the inside, is coated with the RFL adhesion coat 14*a*. This RFL adhesion treatment may be repeated a plurality of times. If the cord 12' is made of glass fibers, the fiber bundle is subjected to this RFL adhesion treatment and then twisted.

Next, a rubber component which suitably contains CSM as a main ingredient is masticated. Various compound ingredients are put into this rubber component and kneaded together, thereby obtaining an uncrosslinked rubber composition. The resultant uncrosslinked rubber composition is dissolved in an organic solvent, such as methyl ethyl ketone (hereinafter referred to as "MEK"), thereby preparing rubber cement.

The cord 12' which has undergone the RFL adhesion treatment is immersed in this rubber cement, and thereafter dried in a drying furnace. At this moment, the cord adhesion coat 15*a* adheres to the cord 12' such that the outside of the cord 12' coated with the RFL adhesion coat 14*a* is coated with the cord adhesion coat 15*a*. This rubber cement treatment may be repeated a plurality of times.

To provide the primary adhesion coat 16*a*, a primary adhesion treatment may be performed prior to the RFL adhesion treatment. In the primary adhesion treatment, the cord 12' is immersed in a primary adhesive agent, such as an epoxy resin solution and an isocyanate resin solution, and heated.

Reinforcing Fabric 13'

An RFL aqueous solution for use in an RFL adhesion treatment is prepared by mixing: an initial condensate (RF) of resorcin (R) and formaldehyde (F); and latex (L).

The reinforcing fabric 13' is immersed in this RFL aqueous solution, squeezed by rolls, and then heated in a heating furnace. At this moment, the reinforcing fabric 13' is impregnated with the RFL aqueous solution. The RFL adhesion coat 14*b* adheres to the reinforcing fabric 13' such that the entire reinforcing fabric 13', including the inside, is coated with the RFL adhesion coat 14*b*. This RFL adhesion treatment may be repeated a plurality of times.

Next, a rubber component containing H-NBR as a main ingredient is masticated. Various compound ingredients are put into this rubber component and kneaded together, thereby obtaining an uncrosslinked rubber composition. The resultant uncrosslinked rubber composition is dissolved in an organic solvent, such as MEK, thereby preparing rubber cement for use in a coating adhesion treatment.

One surface of the reinforcing fabric 13' which has undergone the RFL adhesion treatment is coated with the rubber cement prepared for use in the coating adhesion treatment by knife coating or other methods, and thereafter dried in a drying furnace. At this moment, the cord adhesion coat 15b adheres to the reinforcing fabric 13' such that the one surface of the reinforcing fabric 13' coated with the RFL adhesion coat 14b is coated with the reinforcing fabric adhesion coat 15b. This coating adhesion treatment may be repeated a plurality of times.

Then, both ends of the reinforcing fabric 13' which has undergone the above-described adhesion treatments are joined together to form a cylindrical shape.

To provide the primary adhesion coat 16b, a primary adhesion treatment may be performed prior to the RFL adhesion treatment. In the primary adhesion treatment, the reinforcing fabric 13' is immersed in a primary adhesive agent, such as an epoxy resin solution and an isocyanate resin solution, and heated. To provide the impregnated rubber adhesion coat 17, a soaking adhesion treatment may be performed between the RFL adhesion treatment and the coating adhesion treatment. In the soaking adhesion treatment, the reinforcing fabric 13' is immersed in rubber cement for use in a soaking adhesion treatment and dried.

Shaping Step

Figure 5:
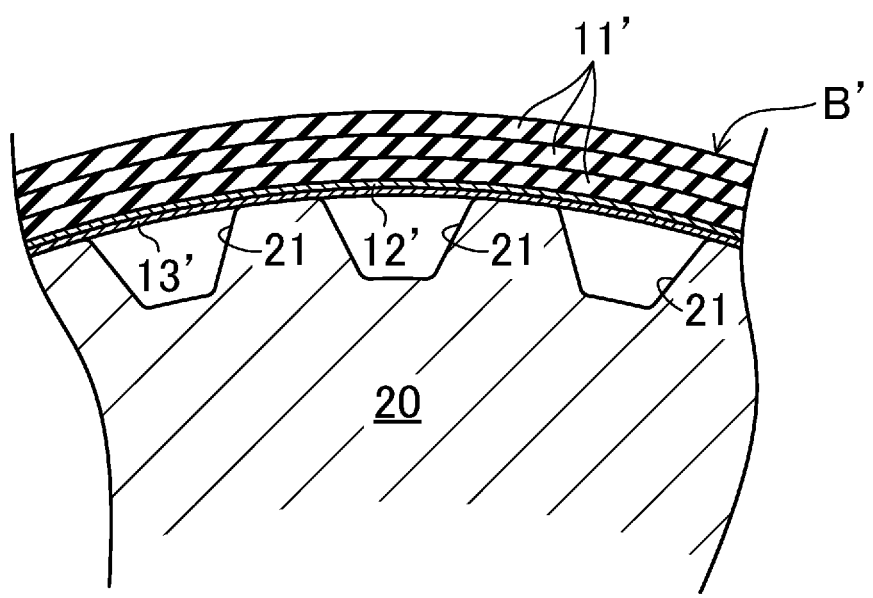
FIG. 5 is a first drawing for explaining a method for forming the toothed belt according to the embodiment.

As illustrated in FIG. 5, the cylindrical reinforcing fabric 13' is placed on the outer periphery of the belt forming mold 20. The cord 12' is helically wound around the reinforcing fabric 13'. The uncrosslinked rubber sheets 11' are then wrapped over the wound cord 12'. A layered body B' is formed on the belt forming mold 20 in this manner. Suitably, the uncrosslinked rubber sheets 11' are arranged such that the grain direction thereof corresponds to the belt length direction.

Crosslinking Step

Figure 6:
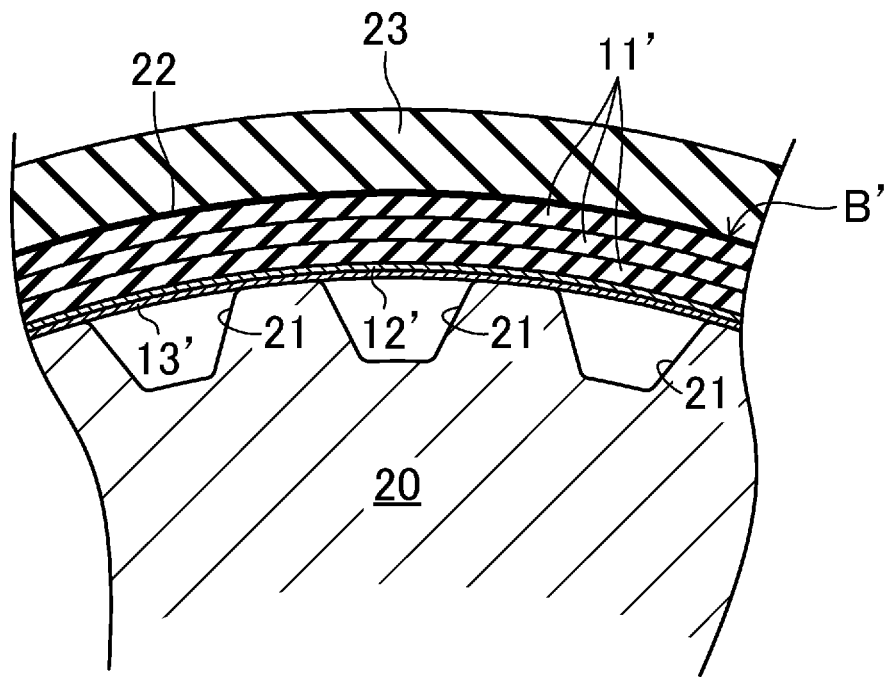
FIG. 6 is a second drawing for explaining the method for forming the toothed belt according to the embodiment.
Figure 7:
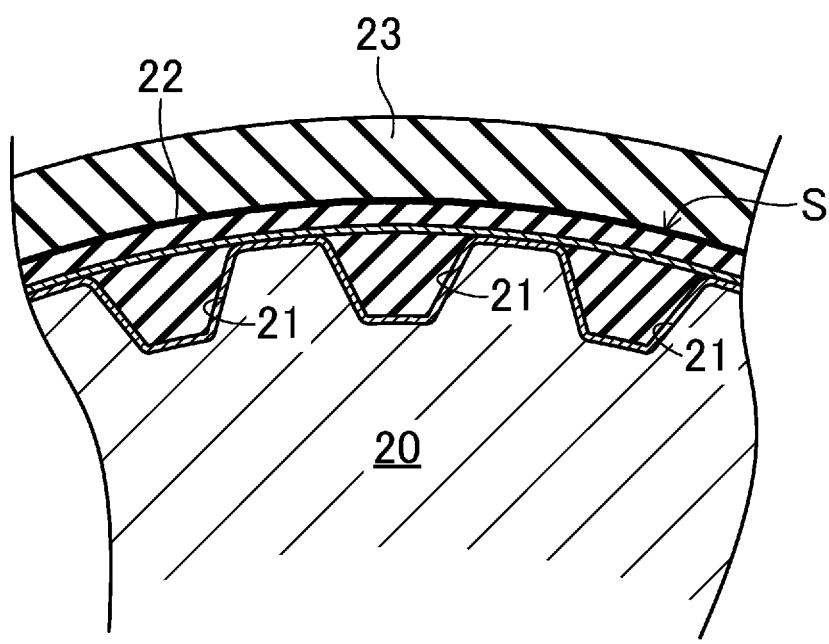
FIG. 7 is a third drawing for explaining the method for forming the toothed belt according to the embodiment.

As illustrated in FIG. 6, a mold release paper 22 is wound around the outer periphery of the layered body B'. After that, a rubber sleeve 23 is placed on the mold release paper 22. The layered body B' with the rubber sleeve 22 is placed in a vulcanizer, and the vulcanizer is sealed. The vulcanizer is filled with high-temperature and high-pressure steam, and the layered body B' with the rubber sleeve 22 is held in the vulcanizer for a predetermined molding time. At this moment, the uncrosslinked rubber sheets 11' of the layered body B' flow into the toothed portion-forming grooves 21 of the belt forming mold 20, while pressing the reinforcing fabric 13'. Through the heating and pressurization, crosslinking of the uncrosslinked rubber sheets 11' proceeds. Moreover, the cord 12' and the reinforcing fabric 13' are combined and integrated with the uncrosslinked rubber sheets 11' via the cord adhesion coat 15a and the reinforcing fabric adhesion coat 15b, respectively. A cylindrical belt slab S is obtained in the end as illustrated in FIG. 7.

Finishing Step

The pressure of the inner space of the vulcanizer is reduced to unseal the vulcanizer. The belt slab S formed between the belt forming mold 20 and the rubber sleeve 23 is removed. The backface of the belt slab S is ground to adjust the thickness. After that, the belt slab S is cut into rings having a predetermined width, and turned inside out, thereby obtaining the toothed belt B.

EXAMPLES

Rubber Composition

The following Rubbers 1-1 to 1-5 for making the belt body, Rubber 2 for making the cord adhesion coat, and Rubbers 3-1 to 3-4 for making the reinforcing fabric adhesion coat were prepared. Constituents of each rubber will also be shown in Table 1.

Rubbers For Making Belt Body

Rubber 1-1

An EPDM 1 (manufactured by JSR Corporation, trade name: EP25, ethylene content: 58.5% by mass, ENB content: 5.1% by mass, Mooney viscosity: 63 $ML_{1+4}$ (125° C.)) as a rubber component was placed into a chamber of an internal Banbury mixer and masticated therein. With respect to 100 parts by mass of this rubber component, 60 parts by mass of FEF carbon black (manufactured by Cabot Japan, K.K.) as a reinforcing material 1, 8 parts by mass of a softener (manufactured by Japan Sun Oil Company, Ltd., trade name: SUMPAR 2280), 5 parts by mass of a zinc oxide (manufactured by HakusuiTech Co., Ltd.) as a vulcanization accelerator aid, 2 parts by mass of trimethylolpropane trimethacrylate (manufactured by Seiko Chemical Co., Ltd., trade name: Hi-Cross M) as a co-crosslinking agent 1, and 3 parts by mass of an organic peroxide (manufactured by NOF CORPORATION, trade name: PERCUMYL D, dicumyl peroxide) as a crosslinking agent 1 were added thereto and kneaded to produce an uncrosslinked rubber composition. This uncrosslinked rubber composition was referred to as "Rubber 1-1."

Rubber 1-2

An uncrosslinked rubber composition was produced to have the same composition as Rubber 1-1 except that EPDM 2 (manufactured by JSR Corporation, trade name: EP21, ethylene content: 61% by mass, ENB content: 5.8% by mass, Mooney viscosity: 26 $ML_{1+4}$ (125° C.)) was used as a rubber component. This uncrosslinked rubber composition was referred to as "Rubber 1-2."

Rubber 1-3

An EPDM 1 (manufactured by JSR Corporation, trade name: EP25) as a rubber component was placed into a chamber of an internal Banbury mixer and masticated therein. With respect to 100 parts by mass of this rubber component, 60 parts by mass of FEF carbon black as a reinforcing material 1, 8 parts by mass of a softener, 5 parts by mass of a zinc oxide as a vulcanization accelerator aid, 1.5 parts by mass of sulfur (manufactured by Hosoi Chemical Industry Co., Ltd.) as a crosslinking agent 4, 2 parts by mass of a sulfenamide-based vulcanization accelerator 1 (manufactured by Ouchi Shinko Chemical Industrial Co., Ltd., trade name: NOCCELER MSA), and 0.7 parts by mass of a thiuram-based vulcanization accelerator 2 (manufactured by Ouchi Shinko Chemical Industrial Co., Ltd., trade name: NOCCELER TET-G) were added thereto and kneaded to produce an uncrosslinked rubber composition. This uncrosslinked rubber composition was referred to as "Rubber 1-3."

Rubber 1-4

An uncrosslinked rubber composition was produced to have the same composition as Rubber 1-1 except that 15 parts by mass of zinc dimethacrylate (manufactured by Kawaguchi Chemical Industry Co., LTD., trade name: ACTOR ZMA) with respect to 100 parts by mass of the rubber component was further added as a co-crosslinking agent 2. This uncrosslinked rubber composition was referred to as "Rubber 1-4."

Rubber 1-5

An H-NBR 1 (manufactured by Zeon Corporation, trade name: Zetpol 2000, combined acrylonitrile content: 36.2% by mass, iodine value: 7 mg/100 mg or less, Mooney viscosity: 85 $ML_{1+4}$ (100° C.)) as a rubber component was placed into a chamber of an internal Banbury mixer and masticated therein. With respect to 100 parts by mass of this rubber component, 45 parts by mass of GPF carbon black (manufactured by Cabot Japan, K.K.) as a reinforcing material 2, 8 parts by mass of polyether ester (manufactured by ADEKA CORPORATION, trade name: ADK CIZER RS700) as a plasticizer 1, 1 part by mass of stearic acid (manufactured by NOF CORPORATION) as a processing aid, 5 parts by mass of a zinc oxide as a vulcanization accelerator aid, 2 parts by mass of trimethylolpropane trimethacrylate as a co-crosslinking agent 1, 8 parts by mass (3.2 parts by mass) of an organic peroxide (manufactured by NOF CORPORATION, trade name: PEROXYMON F40 (purity of 40% by mass), α,α'-di(tri t-butylperoxy) diisopropylbenzene) as a crosslinking agent 2, 1 part by mass of sulfur as a crosslinking agent 4, and 1 part by mass of a benzimidazole-based antioxidant (manufactured by Ouchi Shinko Chemical Industrial Co., Ltd., trade name: NOCRAC MB) were added thereto and kneaded to produce an uncrosslinked rubber composition. This uncrosslinked rubber composition was referred to as "Rubber 1-5."

Rubber For Making Cord Adhesion Coat

Rubber 2

A CSM (manufactured by Tosoh Corporation, trade name: ET-8010, chlorine content: 26% by mass, sulfur content: 0.7% by mass, Mooney viscosity: 40 $ML_{1+4}$ (100° C.)) as a rubber component was placed into a chamber of an internal Banbury mixer and masticated therein. With respect to 100 parts by mass of this rubber component, 30 parts by mass of FEF carbon black as a reinforcing material 1, 20 parts by mass of silica (manufactured by Evonik Japan Co., Ltd., trade name: ULTRASIL VN3) as a reinforcing material 3, 5 parts by mass of polyether ester as a plasticizer 1, 5 parts by mass of DOS (manufactured by Sanken Chemical Co. Ltd.) as a plasticizer 2, 1 part by mass of stearic acid as a processing aid, 5 parts by mass of a zinc oxide as a vulcanization accelerator aid, 2 parts by mass of trimethylolpropane trimethacrylate as a co-crosslinking agent 1, 8 parts by mass (3.2 parts by mass) of an organic peroxide (manufactured by NOF CORPORATION, trade name: PEROXYMON F40) as a crosslinking agent 2, and 1 part by mass of a benzimidazole-based antioxidant 1 were added thereto and kneaded to produce an uncrosslinked rubber composition. This uncrosslinked rubber composition was referred to as "Rubber 2."

Rubbers For Making Reinforcing Fabric Adhesion Coat

Rubber 3-1

An H-NBR 1 (manufactured by Zeon Corporation, trade name: Zetpol 2000) as a rubber component was placed into a chamber of an internal Banbury mixer and masticated therein. With respect to 100 parts by mass of this rubber component, 45 parts by mass of GPF carbon black as a reinforcing material 2, 10 parts by mass of silica as a reinforcing material 3, 8 parts by mass of polyether ester as a plasticizer 1, 1 part by mass of stearic acid as a processing aid, 5 parts by mass of a zinc oxide as a vulcanization accelerator aid, 2 parts by mass of trimethylolpropane trimethacrylate as a co-crosslinking agent 1, 3.2 parts by mass of an organic peroxide (manufactured by NOF CORPORATION, trade name: PERBUTYL P, α,α'-di(tri t-butylperoxy) diisopropylbenzene) as a crosslinking agent 3, 1 part by mass of sulfur as a crosslinking agent 4, and 1 part by mass of a benzimidazole-based antioxidant 1 were added thereto and kneaded to produce an uncrosslinked rubber composition. This uncrosslinked rubber composition was referred to as "Rubber 3-1."

Rubber 3-2

An uncrosslinked rubber composition was produced to have the same composition as Rubber 3-1 except that H-NBR 2 strengthened by an unsaturated carboxylic metal salt (manufactured by Zeon Corporation, trade name: ZeoforteZSC2295, base polymer: Zetpol 2020, Mooney viscosity: 85 $ML_{1+4}$ (100° C.)) was used as a rubber component. This uncrosslinked rubber composition was referred to as "Rubber 3-2."

Rubber 3-3

An H-NBR 3 (manufactured by Zeon Corporation, trade name: Zetpol 2020, combined acrylonitrile content: 36.2% by mass, iodine value: 28 mg/100 mg, Mooney viscosity: 78 $ML_{1+4}$ (100° C.)) as a rubber component was placed into a chamber of an internal Banbury mixer and masticated therein. With respect to 100 parts by mass of this rubber component, 45 parts by mass of GPF carbon black as a reinforcing material 2, 10 parts by mass of silica as a reinforcing material 3, 8 parts by mass of polyether ester as a plasticizer 1, 1 part by mass of stearic acid as a processing aid, 5 parts by mass of a zinc oxide as a vulcanization accelerator aid, 3.2 parts by mass of an organic peroxide (manufactured by NOF CORPORATION, trade name: PERBUTYL P) as a crosslinking agent 3, 1 part by mass of sulfur as a crosslinking agent 4, and 1 part by mass of a benzimidazole-based antioxidant 1 were added thereto and kneaded to produce an uncrosslinked rubber composition. This uncrosslinked rubber composition was referred to as "Rubber 3-3."

Rubber 3-4

An EPDM 3 (manufactured by JSR Corporation, trade name: EP33, ethylene content: 52% by mass, ENB content: 8.1% by mass, Mooney viscosity: 28 $ML_{1+4}$ (125° C.)) as a rubber component was placed into a chamber of an internal Banbury mixer and masticated therein. With respect to 100 parts by mass of this rubber component, 65 parts by mass of FEF carbon black as a reinforcing material 1, 10 parts by mass of silica as a reinforcing material 3, 8 parts by mass of a softener, 1 part by mass of stearic acid as a processing aid, 5 parts by mass of a zinc oxide as a vulcanization accelerator aid, 2 parts by mass of trimethylolpropane trimethacrylate as a co-crosslinking agent 1, 3 parts by mass of an organic peroxide (manufactured by NOF CORPORATION, trade name: PERCUMYL D) as a crosslinking agent 1, and 1 part by mass of sulfur as a crosslinking agent 4 were added thereto and kneaded to produce an uncrosslinked rubber composition. This uncrosslinked rubber composition was referred to as "Rubber 3-4."

A toothed belt having a similar configuration as the toothed belt of the above-described embodiment was produced, using the above-described uncrosslinked rubber sheet

TABLE 1

| | Rubber 1-1 | Rubber 1-2 | Rubber 1-3 | Rubber 1-4 | Rubber 1-5 | Rubber 2 | Rubber 3-1 | Rubber 3-2 | Rubber 3-3 | Rubber 3-4 |
|---|---|---|---|---|---|---|---|---|---|---|
| EPDM 1 | 100 | | 100 | 100 | | | | | | |
| EPDM 2 | | 100 | | | | | | | | |
| EPDM 3 | | | | | | | | | | 100 |
| CSM | | | | | | 100 | | | | |
| H-NBR 1 | | | | | 100 | | 100 | | | |
| Strengthened H-NBR 2 | | | | | | | | 100 | | |
| H-NBR 3 | | | | | | | | | 100 | |
| Reinforcing Material 1 | 60 | 60 | 60 | 60 | | 30 | | | | 65 |
| Reinforcing Material 2 | | | | | 45 | | 45 | 45 | 45 | |
| Reinforcing Material 3 | | | | | 20 | 10 | 10 | 10 | 10 | |
| Softener | 8 | 8 | 8 | 8 | 8 | | 8 | 8 | 8 | 8 |
| Plasticizer 1 | | | | | | 5 | | | | |
| Plasticizer 2 | | | | | | 5 | | | | |
| Processing Aid | | | | | 1 | 1 | 1 | 1 | 1 | 1 |
| Vulcanization Accelerator Aid | 5 | 5 | 5 | 5 | 5 | 5 | 5 | 5 | 5 | 5 |
| Co-Crosslinking Agent 1 | 2 | 2 | | 2 | 2 | 2 | 2 | 2 | | 2 |
| Co-Crosslinking Agent 2 | | | | 15 | | | | | | |
| Crosslinking Agent 1 | 3 | 3 | | 3 | | | | | | 3 |
| Crosslinking Agent 2 | | | | | 8 | 8 | | | | |
| Crosslinking Agent 3 | | | | | | | 3.2 | 3.2 | 3.2 | |
| Crosslinking Agent 4 | | | 1.5 | | 1 | | 1 | 1 | 1 | 1 |
| Vulcanization Accelerator 1 | | | 2 | | | | | | | |
| Vulcanization Accelerator 2 | | | 0.7 | | | | | | | |
| Antioxidant | | | | | 1 | 1 | 1 | 1 | 1 | |

Toothed Belt

The following toothed belts of Examples 1 to 9 and Comparative Examples 1 and 2 were produced. Constituents of each toothed belt will also be shown in Table 2.

Example 1

Rubber 1-1 was formed into an uncrosslinked rubber sheet for making the belt body by calendering.

A cord made of glass fibers was subjected to an RFL adhesion treatment using an RFL aqueous solution containing CSM latex as a latex component. The cord was further subjected to a rubber cement adhesion treatment in which the cord was immersed in rubber cement prepared by dissolving Rubber 2 in MEK and was dried in a drying furnace, so that a cord adhesion coat was adhered to the cord, which was coated with an RFL adhesion coat, and coated the outside of the cord.

One surface of a reinforcing fabric made of nylon fibers (which is a reinforcing fabric, the warp yarn of which was made of twisted nylon yarn and the weft yarn of which was made of wooly finish twisted nylon yarn) was subjected to an RFL adhesion treatment using an RFL aqueous solution containing CSM latex as a latex component. The one surface was further subjected to a coating adhesion treatment in which the one surface was coated, by knife coating, with rubber cement prepared by dissolving Rubber 3-1 in MEK and was dried in a drying furnace, so that a reinforcing fabric adhesion coat was adhered to, and coated, the one surface of the reinforcing fabric, which was coated with an RFL adhesion coat.

for making the belt body, and the cord and reinforcing fabric which had undergone the adhesion treatments. The thus obtained toothed belt was referred to as Example 1.

In this example, the belt length was set to be 400 mm, the belt width to be 20 mm, and the maximum thickness of the belt to be 2.4 mm. The width of the tooth was set to be 1.5 mm, the height of the tooth to be 1.2 mm, and the tooth pitch to be 2 mm.

Example 2

A toothed belt having the same configuration as the toothed belt of Example 1, except that Rubber 1-2 was used as the uncrosslinked rubber sheet for making the belt body, was produced. The thus obtained toothed belt was referred to as Example 2.

Example 3

A toothed belt having the same configuration as the toothed belt of Example 1, except that Rubber 1-3 was used as the uncrosslinked rubber sheet for making the belt body, was produced. The thus obtained toothed belt was referred to as Example 3.

Example 4

A toothed belt having the same configuration as the toothed belt of Example 1, except that Rubber 1-4 was used as the uncrosslinked rubber sheet for making the belt body, was produced. The thus obtained toothed belt was referred to as Example 4.

Example 5

A toothed belt having the same configuration as the toothed belt of Example 4, except that rubber cement made of Rubber 3-2 was used in the coating adhesion treatment on the reinforcing fabric, was produced. The thus obtained toothed belt was referred to as Example 5.

Example 6

A toothed belt having the same configuration as the toothed belt of Example 1, except that rubber cement made of Rubber 3-3 was used in the coating adhesion treatment on the reinforcing fabric, was produced. The thus obtained toothed belt was referred to as Example 6.

Example 7

A toothed belt having the same configuration as the toothed belt of Example 1, except that an RFL aqueous solution containing 2,3-DCB latex as the latex component was used in the RFL adhesion treatments on the cord and the reinforcing fabric, was produced. The thus obtained toothed belt was referred to as Example 7.

Example 8

A toothed belt having the same configuration as the toothed belt of Example 1, except that an RFL aqueous solution containing H-NBR latex as the latex component was used in the RFL adhesion treatments on the cord and the reinforcing fabric, was produced. The thus obtained toothed belt was referred to as Example 8.

Example 9

A toothed belt having the same configuration as the toothed belt of Example 1, except that an RFL aqueous solution containing Vp-SBR latex as the latex component was used in the RFL adhesion treatments on the cord and the reinforcing fabric, was produced. The thus obtained toothed belt was referred to as Example 9.

Comparative Example 1

A toothed belt having the same configuration as the toothed belt of Example 1, except that Rubber 1-5 was used as the uncrosslinked rubber sheet for making the belt body, was produced. The thus obtained toothed belt was referred to as Comparative Example 1.

Comparative Example 2

A toothed belt having the same configuration as the toothed belt of Example 1, except that rubber cement made of Rubber 3-4 was used in the coating adhesion treatment on the reinforcing fabric, was produced. The thus obtained toothed belt was referred to as Comparative Example 2.

TABLE 2

| | Example | | | | | | | | | Comparative Example | |
|---|---|---|---|---|---|---|---|---|---|---|---|
| | 1 | 2 | 3 | 4 | 5 | 6 | 7 | 8 | 9 | 1 | 2 |
| Belt Body | Rubber 1-1 EPDM | Rubber 1-2 EPDM | Rubber 1-3 EPDM | Rubber 1-4 EPDM | Rubber 1-4 EPDM | Rubber 1-1 EPDM | Rubber 1-1 EPDM | Rubber 1-1 EPDM | Rubber 1-1 EPDM | Rubber 1-5 H-NBR | Rubber 1-1 EPDM |
| Cord/RFL Adhesion Coat | CSM | CSM | CSM | CSM | CSM | CSM | 2,3-DCB | H-NBR | Vp-SBR | CSM | CSM |
| Cord Adhesion Coat | Rubber 2 CSM | Rubber 2 CSM | Rubber 2 CSM | Rubber 2 CSM | Rubber 2 CSM | Rubber 2 CSM | Rubber 2 CSM | Rubber 2 CSM | Rubber 2 CSM | Rubber 2 CSM | Rubber 2 CSM |
| Reinforcing Fabric/RFL Adhesion Coat | CSM | CSM | CSM | CSM | CSM | CSM | 2,3-DCB | H-NBR | Vp-SBR | CSM | CSM |
| Reinforcing Fabric Adhesion Coat | Rubber 3-1 H-NBR | Rubber 3-1 H-NBR | Rubber 3-1 H-NBR | Rubber 3-1 H-NBR | Rubber 3-2 H-NBR | Rubber 3-3 H-NBR | Rubber 3-1 H-NBR | Rubber 3-1 H-NBR | Rubber 3-1 H-NBR | Rubber 3-1 H-NBR | Rubber 3-4 EPDM |
| Heat Resistance Durability | 300 h — | 300 h — | 200 h Reinforcing Fabric Separates | 300 h — | 300 h — | 200 h Reinforcing Fabric Separates | 250 h Reinforcing Fabric Separates | 250 h Reinforcing Fabric Separates | 200 h Reinforcing Fabric Separates | 150 h Reinforcing Fabric Separates | 300 h — | 100 h Cord Separates |
| Cold Resistance Durability | No Crack | Micro Crack | No Crack | No Crack | No Crack | No Crack | No Crack | No Crack | No Crack | Crack to Cord | No Crack |

Test Evaluation Method

Figure 8:
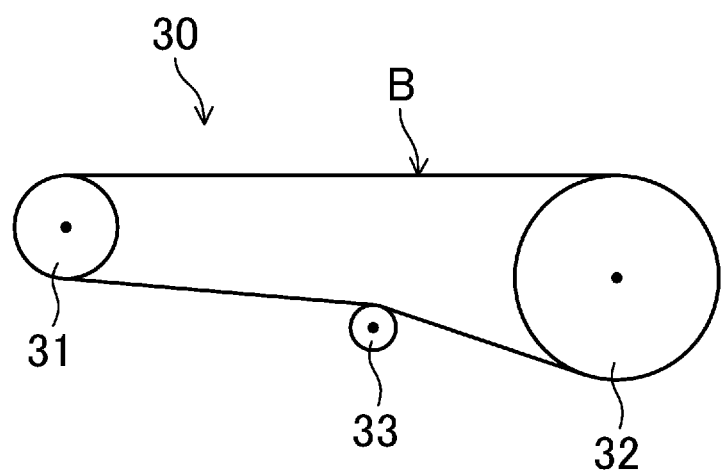
FIG. 8 illustrates a layout of pulleys of a belt running tester.

FIG. 8 illustrates a layout of pulleys of a belt running tester 30.

The belt running tester 30 includes a drive pulley 31, a driven pulley 32, and an idler pulley 33. The drive pulley 31 is provided with toothed portion fitting grooves at 21 locations of the periphery thereof. The driven pulley 32 is provided with toothed portion fitting grooves at 42 locations of the periphery thereof. The idler pulley 33 has a flat periphery so that it is possible to press the backface of the belt. All of the drive pulley 31, the driven pulley 32, and the idler pulley 33 are made of carbon steel (S45C).

The toothed belts B of Examples 1 to 9 and Comparative Examples 1 and 2 were evaluated for the heat resistance durability and cold resistance durability, using the belt running tester 30 in the following manner.

Heat Resistance Durability Test

Each toothed belt B was wrapped around the belt running tester 30 such that the toothed portions were fitted in the grooves of the drive pulley 31 and the grooves of the driven pulley 32, and that the backface of the belt was in contact with the idler pulley 33. A dead weight was then applied to the driven pulley 32 to apply a tension of 200 N to the toothed belt B. The drive pulley 31 was rotated at 1000 rpm under an ambient temperature of 120° C. to run the belt. The belt running was stopped every 50 hours to visually check whether there was any breakage or not. The maximum belt running time was set to be 300 hours.

Cold Resistance Durability Test

Each toothed belt B was set on the belt running tester 30 just like in the heat resistance durability test. The drive pulley 31 was rotated at 1000 rpm under an ambient temperature of −40° C. for one minute to make the belt run. After that, the drive pulley 31 was stopped for 30 minutes. This procedure was defined as one cycle. Whether there was any breakage or not was visually checked after carrying out 500 cycles.

Test Evaluation Results

The test results are shown in Table 2.

In the heat resistance durability tests, no breakage was found in Examples 1, 2, 4, and 5 until 300 hours of running. Breakage was found in Examples 6 and 7 by the check after 250 hours of running. Breakage was found in Examples 3 and 8 by the check after 200 hours of running. Breakage was found in Example 9 by the check after 150 hours of running. Peeling of the reinforcing fabric was found in Example 3 and 6 to 9. No breakage was found in Comparative Example 1 until 300 hours of running, whereas in Comparative Example 2 breakage was found by the check after 100 hours of running. Peeling of the cord was found in Comparative Example 2.

In the cold resistance durability tests, no crack was found in the backface of the belt in any of Examples 1 and 3 to 9, except in Example 2 in which a micro crack was found in the backface of the belt. No crack was found in the backface of the belt in Comparative Example 2, whereas in Comparative Example 1 a crack that reaches or almost reaches the cord was found in the backface of the belt.

The present invention is useful in the technical field of a toothed belt.

Embodiments have been described above as a example techniques of the present disclosure, in which the attached drawings and the detailed description are provided. As such, elements illustrated in the attached drawings or the detailed description may include not only essential elements for solving the problem, but also non-essential elements for solving the problem in order to illustrate such techniques. Thus, the mere fact that those non-essential elements are shown in the attached drawings or the detailed description should not be interpreted as requiring that such elements be essential. Since the embodiments described above are intended to illustrate the techniques in the present disclosure, it is intended by the following claims to claim any and all modifications, substitutions, additions, and omissions that fall within the proper scope of the claims appropriately interpreted in accordance with the doctrine of equivalents and other applicable judicial doctrines.

What is claimed is:

1. A toothed belt provided with toothed portions arranged at a regular pitch in a belt length direction, the toothed belt comprising:
    a belt body made of a first rubber composition comprising:
        as a main ingredient of a first rubber component, ethylene-α-olefin elastomer having an ethylene content of 44% by mass to 66% by mass; and
        as a reinforcing material of the first rubber component, carbon black being 50 parts by mass or more and 80 parts by mass or less with respect to 100 parts by mass of the first rubber component; and
    a reinforcing fabric adhered to a surface of the belt body on a toothed side, with a reinforcing fabric adhesion coat interposed between the belt body and the reinforcing fabric, the reinforcing fabric adhesion coat being made of at least a second rubber composition containing hydrogenated nitrile-butadiene rubber as a main ingredient of a second rubber component and carbon black as a reinforcing material.

2. The toothed belt of claim 1, wherein
the ethylene-α-olefin elastomer contained in the first rubber component of the first rubber composition making the belt body has an ethylene content of 60% by mass or less.

3. The toothed belt of claim 1, wherein
the rubber composition making the belt body is crosslinked by using an organic peroxide.

4. The toothed belt of claim 1, wherein
the rubber composition making the belt body contains a co-crosslinking agent.

5. The toothed belt of claim 4, wherein
the co-crosslinking agent contains trimethylolpropane trimethacrylate.

6. The toothed belt of claim 4, wherein
the co-crosslinking agent contains zinc dimethacrylate.

7. The toothed belt of claim 1, wherein
the second rubber component of the second rubber composition making the reinforcing fabric adhesion coat contains a hydrogenated nitrile-butadiene rubber strengthened by an unsaturated carboxylic metal salt.

8. The toothed belt of claim 1, wherein
a combined acrylonitrile content of the hydrogenated nitrile-butadiene rubber contained in the second rubber component of the second rubber composition making the reinforcing fabric adhesion coat is 30% by mass to 50% by mass.

9. The toothed belt of claim 1, wherein
an iodine value of the hydrogenated nitrile-butadiene rubber contained in the second rubber component of the second rubber composition making the reinforcing fabric adhesion coat is 2 mg/100 mg to 30 mg/100 mg.

10. The toothed belt of claim 1, wherein
the reinforcing fabric is coated with an RFL adhesion coat made of a mixture containing: a condensate of resorcin and formaldehyde; and a rubber component derived from latex,
the reinforcing fabric adhesion coat is provided so as to coat a surface of the reinforcing fabric facing the belt body, the reinforcing fabric having been coated with the RFL adhesion coat, and
the rubber component of the RFL adhesion coat coating the reinforcing fabric contains chlorosulfonated polyethylene or a 2,3-dichloro-1,3-butadiene polymer.

11. The toothed belt of claim 1, further comprising:
a cord buried in the belt body with a cord adhesion coat interposed between the belt body and the cord, the cord adhesion coat being made of a rubber composition containing chlorosulfonated polyethylene as a main ingredient of a rubber component.

12. The toothed belt of claim 11, wherein
a chlorine content of the chlorosulfonated polyethylene contained in the rubber component of the rubber composition making the cord adhesion coat is 20% by mass to 45% by mass.

13. The toothed belt of claim 11, wherein
a sulfur content of the chlorosulfonated polyethylene contained in the rubber component of the rubber composition making the cord adhesion coat is 0.3% by mass to 1.5% by mass.

14. The toothed belt of claim 11, wherein
the cord is coated with an RFL adhesion coat made of a mixture containing: a condensate of resorcin and formaldehyde; and a rubber component derived from latex,
the cord adhesion coat is provided to coat an outside of the cord coated with the RFL adhesion coat, and
the rubber component of the RFL adhesion coat coating the cord contains chlorosulfonated polyethylene or a 2,3-dichloro-1,3-butadiene polymer.

15. The toothed belt of claim 1, wherein the carbon black contained in the first rubber composition making the belt body includes FEF carbon black.

16. The toothed belt of claim 1, wherein the carbon black contained in the second rubber composition making the reinforcing fabric adhesion coat includes GPF carbon black.

* * * * *